(12) United States Patent
Hu et al.

(10) Patent No.: US 11,036,028 B2
(45) Date of Patent: Jun. 15, 2021

(54) LENS DRIVING MECHANISM

(71) Applicant: TDK TAIWAN CORP., Yangmei Taoyuan (TW)

(72) Inventors: Chao-Chang Hu, Yangmei Taoyuan (TW); Che-Ju Lan, Yangmei Taoyuan (TW); Hung-Chun Chen, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 103 days.

(21) Appl. No.: 15/977,152

(22) Filed: May 11, 2018

(65) Prior Publication Data

US 2018/0329171 A1 Nov. 15, 2018

Related U.S. Application Data

(60) Provisional application No. 62/505,420, filed on May 12, 2017.

(30) Foreign Application Priority Data

Mar. 19, 2018 (CN) .......................... 201810225323.9

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 3/10* (2013.01); *G03B 5/00* (2013.01); *H02K 11/21* (2016.01); *H02K 11/33* (2016.01); *H02K 41/0356* (2013.01);
*G03B 13/36* (2013.01); *G03B 2205/0007* (2013.01); *G03B 2205/0069* (2013.01); *H02K 2211/03* (2013.01)

(58) Field of Classification Search
CPC ........ G02B 7/09; G02B 27/646; H02K 11/21; H02K 41/0356; H02K 11/33; H02K 2211/03; G03B 13/36; G03B 2205/0069; G03B 3/10; G03B 5/00; G03B 2205/0007
See application file for complete search history.

(56) References Cited

U.S. PATENT DOCUMENTS

2017/0123180 A1* 5/2017 Osaka .................. H04N 5/2254

FOREIGN PATENT DOCUMENTS

| CN | 103227898 A | 7/2013 |
| CN | 1064668846 A | 3/2017 |

(Continued)

OTHER PUBLICATIONS

Chinese Office Action dated Jan. 27, 2021 for the corresponding Application No. 201810225323.9, 7 pages, No Translation.

*Primary Examiner* — Jack Dinh
(74) *Attorney, Agent, or Firm* — Muncy, Geissler, Olds & Lowe, P.C.

(57) ABSTRACT

A lens driving mechanism is provided, including a lens holder for holding a lens, a circuit board disposed at one side of the lens holder, a driving element, a position sensing element and an integrated circuit module. The position sensing element and the integrated circuit module are disposed on the circuit board, wherein the integrated circuit module includes a driving circuit unit electrically connected to the driving element, to move the lens holder relative to the circuit board.

15 Claims, 11 Drawing Sheets

(51) Int. Cl.
*H02K 11/21* (2016.01)
*H02K 11/33* (2016.01)
*H02K 41/035* (2006.01)
*G03B 5/00* (2021.01)
*G03B 3/10* (2021.01)
G03B 13/36 (2021.01)

(56) References Cited

FOREIGN PATENT DOCUMENTS

| | | |
|---|---|---|
| CN | 106647107 A | 5/2017 |
| WO | WO2015124966 A1 | 8/2015 |

* cited by examiner

LENS DRIVING MECHANISM

CROSS-REFERENCE TO RELATED APPLICATIONS

The present application claims priority to U.S. Provisional Patent Application No. 62/505,420, filed on May 12, 2017, and China Patent Application No. 201810225323.9 filed on Mar. 19, 2018, which is incorporated by reference herein in its entirety.

BACKGROUND OF THE INVENTION

Field of the Invention

The invention relates to a lens driving mechanism including a voice coil motor (VCM), and more particularly to a lens driving mechanism including an integrated circuit element disposed in a voice coil motor.

Description of the Related Art

Current mobile devices (e.g. mobile phones) normally include a digital-image capturing function, which is made possible through the miniaturization of lens driving mechanisms. One kind of micro lens driving mechanism that is widely used is the voice coil motor, which uses a combination of coils, magnets, and springs to hold the lenses and to drive the lenses in the direction of the optical axis to obtain auto focus (AF) or optical image stabilization (OIS).

During the focusing process of the present voice coil motor, a driving circuit element disposed outside the voice coil motor is required to drive the voice coil motor. However, the volume occupied by the driving circuit element generally is not beneficial for the mechanism miniaturization. As a result, how to overcome this problem and design a lens driving mechanism having a smaller volume has become an important issue.

BRIEF SUMMARY OF THE INVENTION

Because of the problem stated above, one aspect of the present invention is to provide a lens driving mechanism, including a lens holder for holding a lens, a circuit board disposed at one side of the lens holder, a driving element, a position sensing element and an integrated circuit module. The position sensing element and the integrated circuit module are disposed on the circuit board, wherein the integrated circuit module includes a driving circuit unit electrically connected to the driving element, to move the lens holder relative to the circuit board.

According to an embodiment of the present invention, the integrated circuit module further includes a controller unit electrically connected to the driving circuit unit and the position sensing element.

According to an embodiment of the present invention, the integrated circuit module further includes a signal amplifying unit electrically connected to the position sensing element and the controller unit.

According to an embodiment of the present invention, the controller unit, the signal amplifying unit and the driving circuit unit are integrated in an integrated circuit element.

According to an embodiment of the present invention, the controller unit, the signal amplifying unit, the driving circuit unit and the position sensing element are integrated in an integrated circuit element.

According to an embodiment of the present invention, the integrated circuit module further includes a controller unit and two signal amplifying units, and the driving circuit unit, the controller unit and the signal amplifying units are integrated in an integrated circuit element.

According to an embodiment of the present invention, the lens driving mechanism further includes two position sensing elements, and the integrated circuit module further includes two position sensing elements, two controller units and two signal amplifying units, wherein the position sensing elements, the driving circuit units, the controller units and the signal amplifying units are respectively integrated in two integrated circuit elements.

According to an embodiment of the present invention, the lens driving mechanism further includes an acceleration sensor. The integrated circuit module includes a controller unit electrically connected to the acceleration sensor.

According to an embodiment of the present invention, the acceleration sensor is disposed on the circuit board.

According to an embodiment of the present invention, the lens driving mechanism further includes a digital signal processor electrically connected to the controller unit and the acceleration sensor.

According to an embodiment of the present invention, the digital signal processor is disposed on the circuit board.

According to an embodiment of the present invention, the lens driving mechanism further includes a base, and the base and the integrated circuit module are formed integrally by a semiconductor embedded substrate technology.

According to another embodiment of the present invention, a lens driving mechanism is provided, including a lens holder for holding a lens, a circuit substrate disposed at one side of the lens holder, a driving element, a position sensing element disposed on the circuit board, and an integrated circuit module electrically connected to the driving element and disposed on the circuit board to drive the lens holder to move relative to the circuit board, wherein the integrated circuit includes an acceleration sensor.

According to a further embodiment of the present invention, a multiple-lens driving system is provided, including two lens driving mechanisms, an acceleration sensor and a digital signal processor. The digital signal processor is electrically connected to the integrated circuit modules and the acceleration sensor in lens driving mechanisms.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A lens driving mechanism is discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
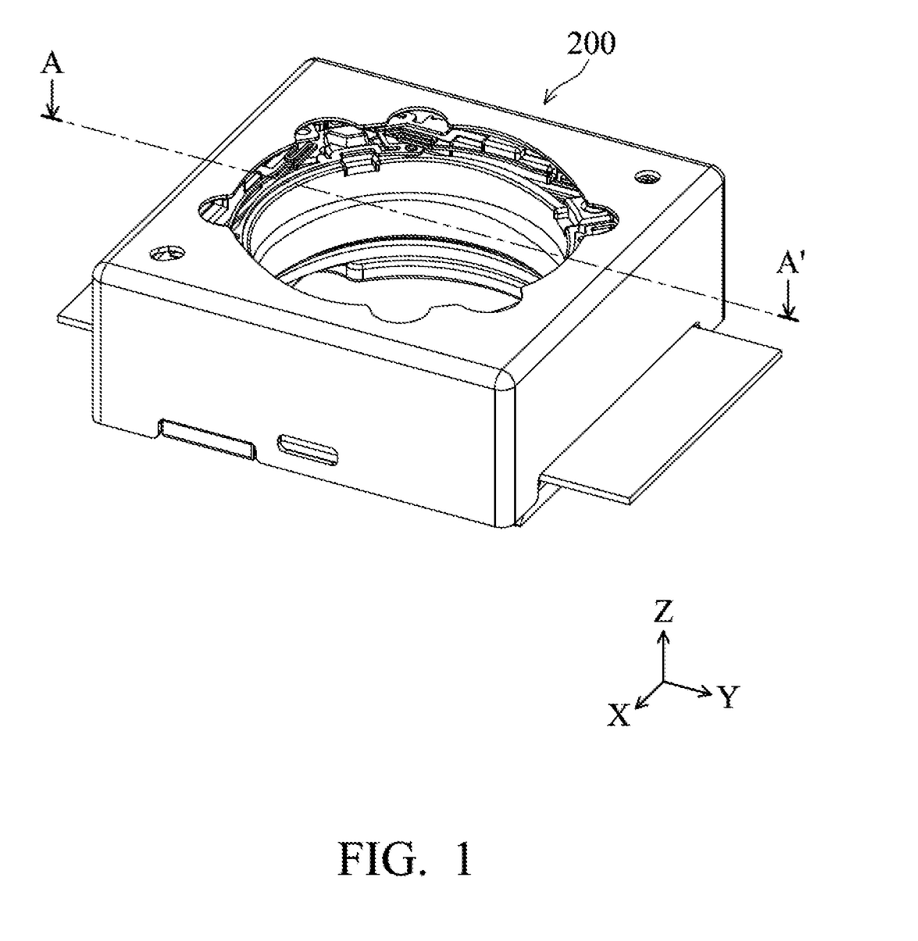
FIG. 1 is a perspective view of a lens driving module in accordance with an embodiment of the invention.
Figure 2:
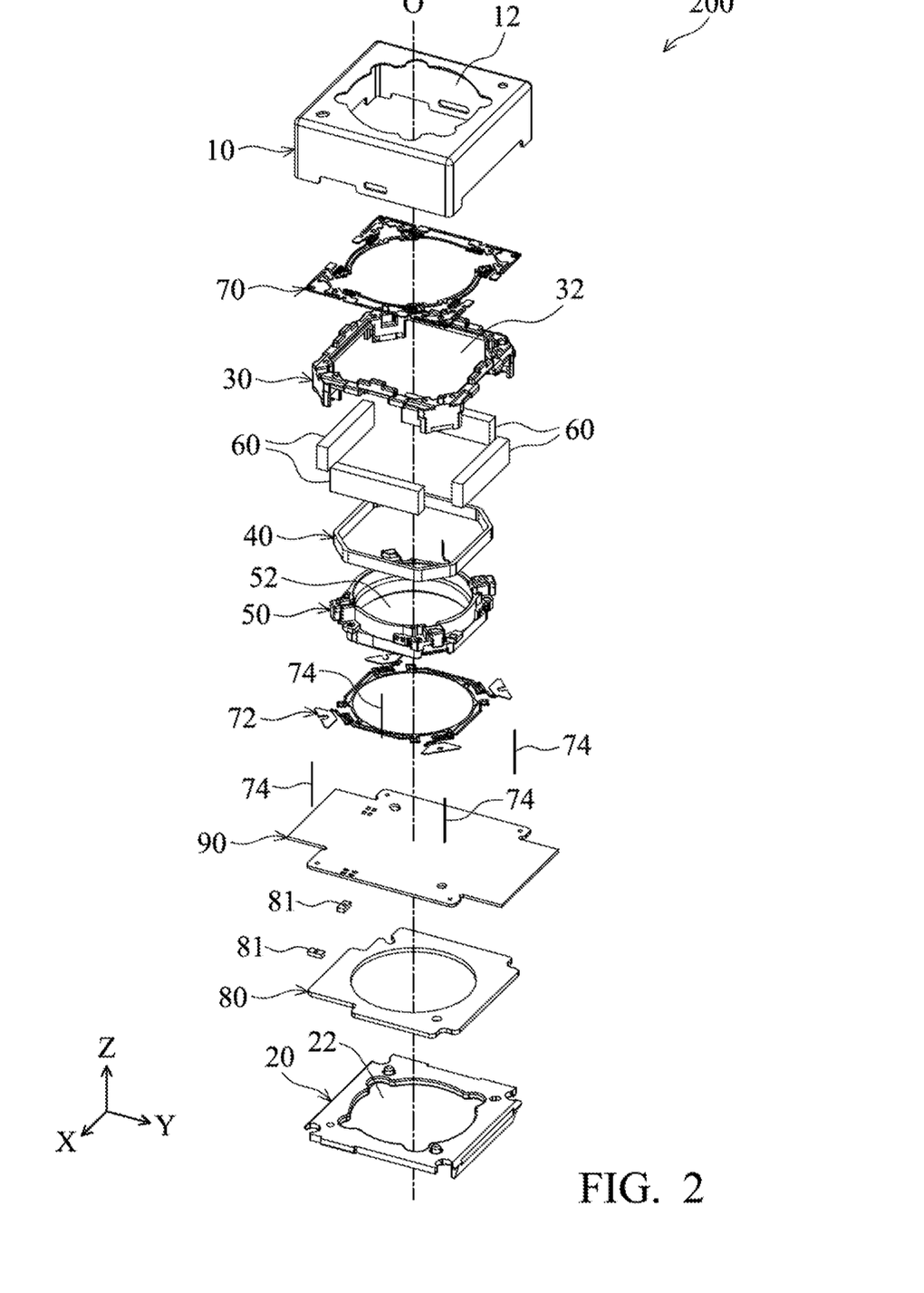
FIG. 2 is an exploded view of the lens driving module in FIG. 1.
Figure 3:
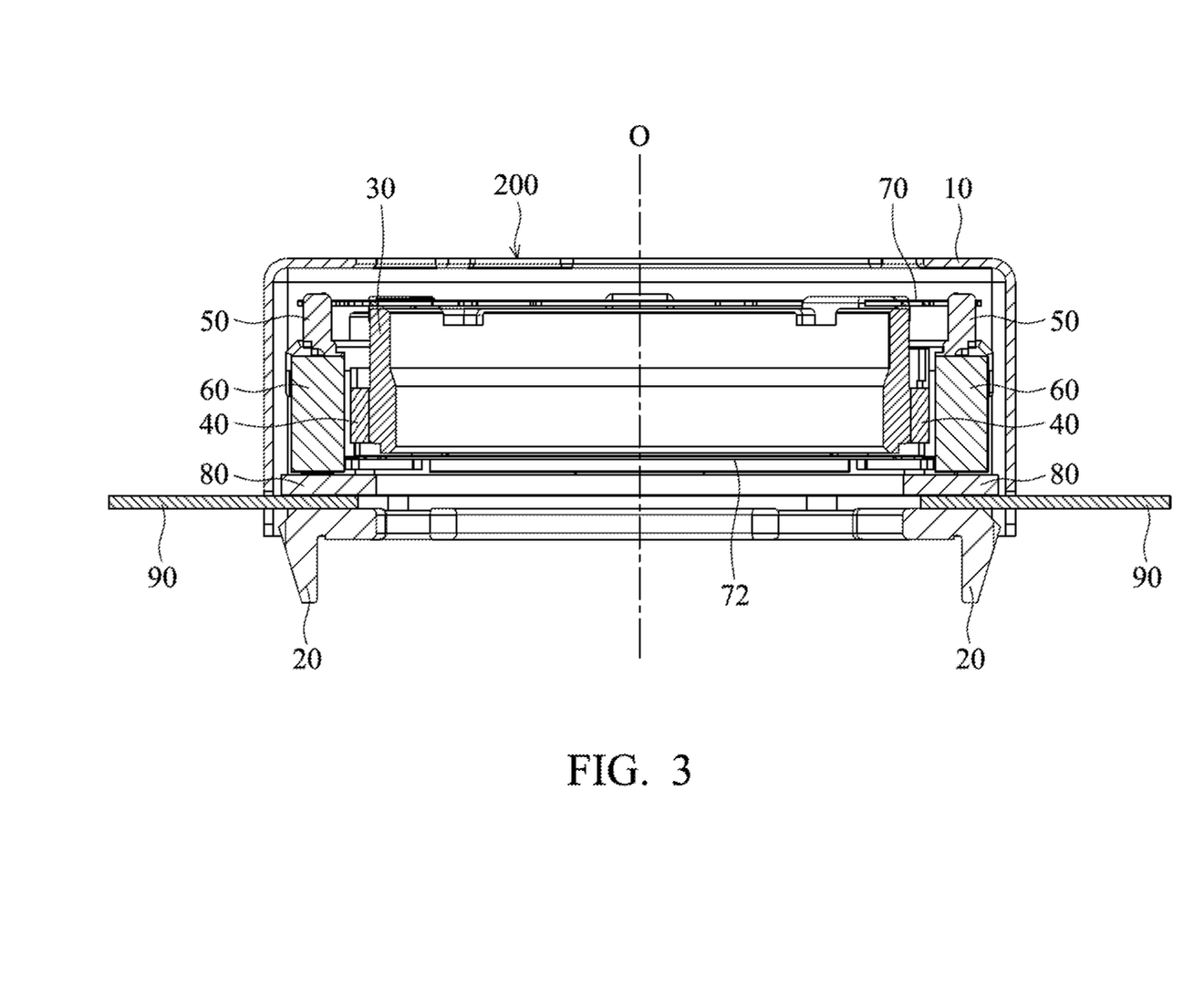
FIG. 3 is a cross-sectional view which takes along the line A-A' in FIG. 1.

Referring to FIGS. 1-3, wherein FIG. 1 is a perspective view of the lens driving module 200, according to an embodiment of the present invention. FIG. 2 is a exploded view of the lens driving module 200 in FIG. 1. FIG. 3 is a cross-sectional view which takes along the line A-A' in FIG. 1. The lens driving module 200 is used for holding an optical element (not shown), wherein the lens driving module 200 may be, for example, a voice coil motor having optical image stabilization function, and it may have both auto focus and optical image stabilization functions.

As shown in FIGS. 1-3, in this embodiment, the lens driving module 200 mainly includes a top casing 10, a base 20, a holder 30, a coil 40, a frame 50, a plurality of driving magnets 60, a upper spring 70, a lower spring 72, a group of suspension wires 74, a circuit board 80, two position sensing elements 81 and a driving board 90.

The top casing 10 can be combined with the base 20 to form a housing for the lens driving module 200. It should be noted that a top casing opening 12 and a base opening 22 are respectively formed on the top casing 10 and the base 20. The center of the top casing opening 12 is located at an optical axis O of a lens (not shown). The base opening 22 corresponds to an image sensor (not shown) placed outside the lens driving module 200. Accordingly, the lens in the lens driving module 200 can perform image focusing in the direction of the optical axis O.

The holder 30 has a through hole 32, wherein the optical element can be fixed in the through hole 32. The coil 40 is wound around the outer surface of the holder 30. The frame 50 has an opening 52, wherein the driving magnets 60 are fixed on the frame 50. It should be noted that a magnetic force may be generated by the interaction between the driving magnets 60 and the coil 40 to move the holder 30 relative to the frame 50 along the Z-direction, thereby achieving fast focusing.

In this embodiment, the holder 30 and the lens therein are movably disposed in the frame 50. More specifically, the holder 30 is suspended in the frame 50 by the upper spring 70 and the lower spring 72 made of a metal material (FIG. 3). When a current is supplied to the coil 40, the coil 40 can act with the magnetic field of the driving magnets 60 to generate an electromagnetic force to move the holder 30 and the lens therein along the optical axis O direction with respect to the frame 50 to achieve auto focusing.

The circuit board 80, such as a flexible printed circuit board (FPC), is fixed to the base 20 by adhesion, for example. In this embodiment, the circuit board 80 is electrically connected to electronic elements inside or outside the lens driving module 200 to perform auto focus, optical image stabilization, etc.

One end of the four suspension wires 74 is fixed to the circuit board 80 and the other end is connected to the upper spring 70, so that the frame 50 and the lens holder 30 can be suspended in the top casing 10 by suspension wires 74. The suspension wires 74 may include a metal material.

The driving board 90, which may be a printed circuit board, has driving coils (not shown) therein, and is fixed to the circuit board 80 by adhesion. It should be realized that the circuit board 80 may transmit electrical signals to the driving board 90, and the circuit board 80 may also transmit electrical signals to the coil 40 through the suspension wires 74 and the upper springs 70, thereby controlling the movement of the holder 30 along the X-axis, Y-axis or Z-axis.

Furthermore, the circuit board 80 can generate electrical signals to the coils of the driving board 90, and the coils in the driving board 90 (e.g. flat printed coils) can act with the driving magnets 60 on the frame 50 to generate an electromagnetic force to move the frame 50 and the holder 30 therein along a direction that is perpendicular to the optical axis O (parallel to the XY plane). As a result, the OIS function is achieved.

Figure 4A:
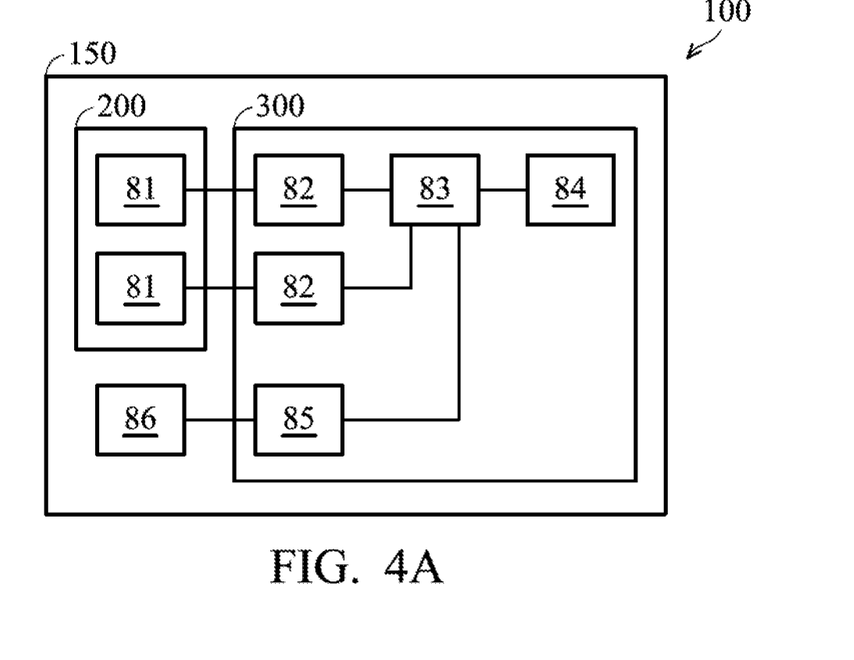
FIG. 4A is a schematic view of a lens driving mechanism includes a lens driving module, an integrated circuit module, a substrate and an acceleration sensor.

Referring to FIG. 4A, the lens driving module 200 may be disposed on a substrate 150 with an acceleration sensor 86 and an integrated circuit module 300 to form a lens driving mechanism 100. Only two position sensing elements 81 are shown in the lens driving module 200, and other elements are omitted for simplicity. As shown in FIG. 4A, the integrated circuit module 300 is disposed outside the lens driving module 200, and the two position sensing elements 81 are disposed in the lens driving module 200 (e.g. disposed in the space formed between the top casing 10 and the base 20, or disposed on any of the elements shown in FIG. 2). Two signal amplifying units 82 are disposed in the integrated circuit module 300 and respectively electrically connected to the two position sensing elements 81, and a controller unit 83 in the integrated circuit module 300 is electrically connected to the two signal amplifying units 82. Furthermore, a driving circuit unit 84 in the integrated circuit module 300 is electrically connected to the controller unit 83, and a digital signal processor 85 in the integrated circuit module 300 is electrically connected to the controller unit 83 and an acceleration sensor 86 outside the integrated circuit module 300. In particular, the two signal amplifying units 82, the controller unit 83, the driving circuit unit 84 and the digital signal processor 85 are packaged together in the integrated circuit module 300 and integrated in an integrated circuit element.

It should be noted that the examples in the description are only for illustration purpose, and the amount of elements of the lens driving mechanism 100 is not limited thereto. For example, the lens driving mechanism 100 may include one or more than two signal amplifying units 82, more than two controller units 83 or more than two driving circuit units 84, etc.

The position sensing element 81 may be, for example, Hall effect sensors, magneto resistance (MR) sensors, or Fluxgate sensors, and can be used to learn the position offset amount of the frame 50 and the holder 30 with respect to the base 20 in the X-axis and Y-axis directions by detecting the magnetic field variation of the driving magnets 60 on the frame 50. The MR sensor may be, for example, a giant magneto resistance (GMR) sensor or a tunneling magneto resistance (TMR) sensor. The signal amplifying unit 82 may be, for example, an analog front end (AFE) circuit to amplify and process the signal from the position sensing element 81, and the signal amplifying unit 82 may accordingly transmit a conversion signal to the controller unit 83. The controller unit 83 may be, for example, a servo digital signal processor for receiving the signals from the amplifier unit 82 and the digital signal processor 85, and may accordingly transmit a control signal to the driving circuit unit 84, wherein the controller unit 83 may have a proportional-integral-derivative (PID) control circuit to provide feedback control based on the received signal. The driving circuit unit 84 is used for receiving a control signal delivered from the controller unit 83, thereby transmits a linear/pulse width modulation (PWM) signal to the coil 40 or the driving coil in the driving board 90 (i.e. driving element), which are electrically connected to the driving circuit unit 84, to drive the holder 30 to move. The digital signal processor 85 is used for processing a detecting signal from the acceleration sensor 86 and transmitting a electrical signal to the controller unit 83 based on the detecting signal. The acceleration sensor 86 may be, for example, a gyro sensor for detecting the status of the lens driving module 200.

However, in the configuration of the elements above, the signal amplifying unit 82, the controller unit 83, the driving circuit unit 84, the digital signal processor 85 and the acceleration sensor 86 are disposed outside the lens driving module 200, so additional space is occupied. As a result, the available space that remains in the lens driving mechanism 100 is also reduced. To solve this problem, some of these elements may be integrated in the lens driving module 200 (e.g. disposed in the space formed between the top casing 10 and the base 20 or disposed on any of the elements shown in FIG. 2) in the following embodiments. Therefore, the available space outside the lens driving module 200 may be increased, and the miniaturization of the lens driving mechanism 100 may be achieved.

Figure 4B:
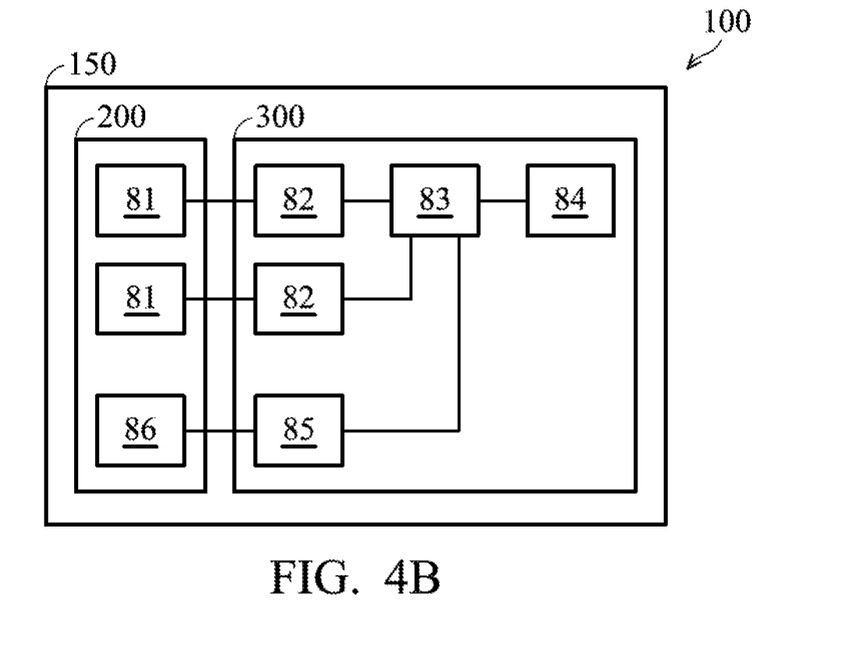
FIG. 4B is a schematic view of a lens driving mechanism according to another embodiment of the present invention.

In another embodiment, as shown in FIG. 4B, the configuration of the elements is similar as that in FIG. 4A, but the difference is that the position sensing elements 81 and the acceleration sensor 86 are disposed in the lens driving module 200. When comparing with the configuration in FIG. 4A, the amount of elements outside the lens driving module 200 may be reduced, thereby achieving mechanism miniaturization.

Figure 5A:
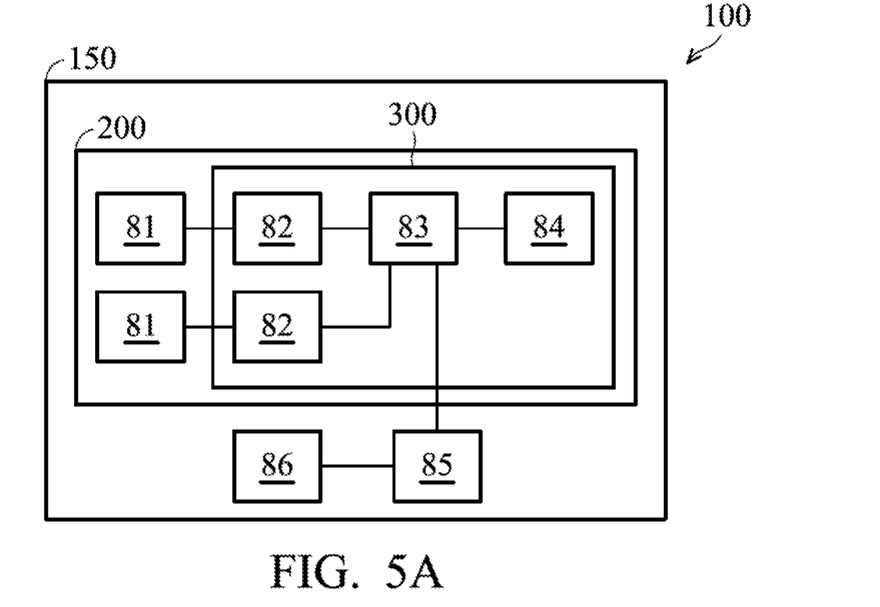
FIG. 5A is a schematic view of a lens driving mechanism according to another embodiment of the present invention.

In another embodiment, as shown in FIG. 5A, two position sensing elements 81, two signal amplifying units 82, a controller unit 83 and a driving circuit unit 84 are disposed together in the lens driving module 200 to decrease the amount of elements outside the lens driving module 200, thereby achieving mechanism miniaturization. The two signal amplifying units 82, the controller unit 83 and the driving circuit unit 84 are packaged together in the same integrated circuit module 300 and integrated in an integrated circuit element. Based on this packaging manner, the performance of the lens driving mechanism 100 may be enhanced. Furthermore, the digital signal processor 85 is disposed outside the lens driving module 200 and may be electrically connected to multiple acceleration sensors 86, so it is much suitable to be applied in a multiple-lens driving module.

Figure 5B:
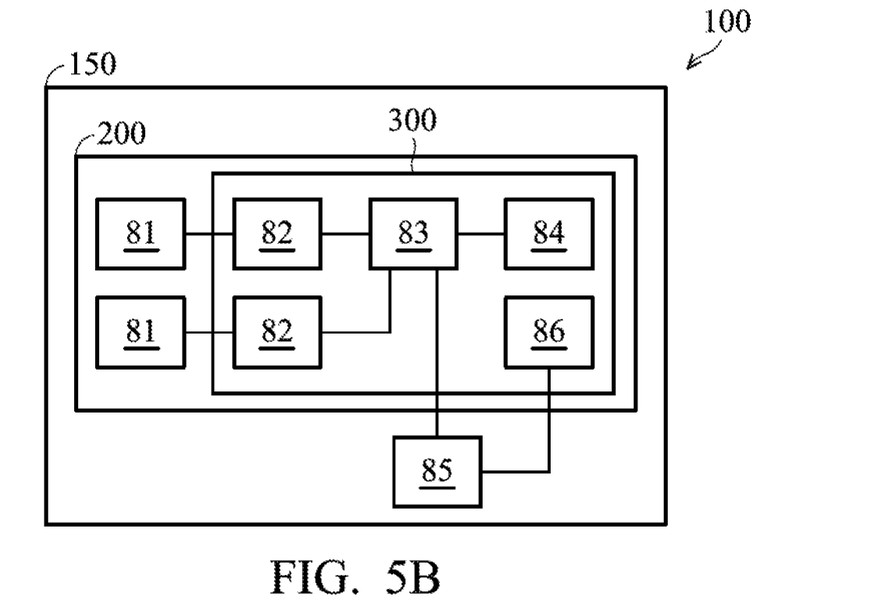
FIG. 5B is a schematic view of a lens driving mechanism according to another embodiment of the present invention.

The acceleration sensor 86 may be disposed in the lens driving module 200, as shown in FIG. 5B, which is different from the configuration in FIG. 5A. In this embodiment, because the acceleration sensor 86 is disposed in the lens driving module 200 and integrated in the integrated circuit module 300, the amount of elements outside the lens driving module 200 may be reduced, thereby achieving mechanism miniaturization.

Figure 6A:
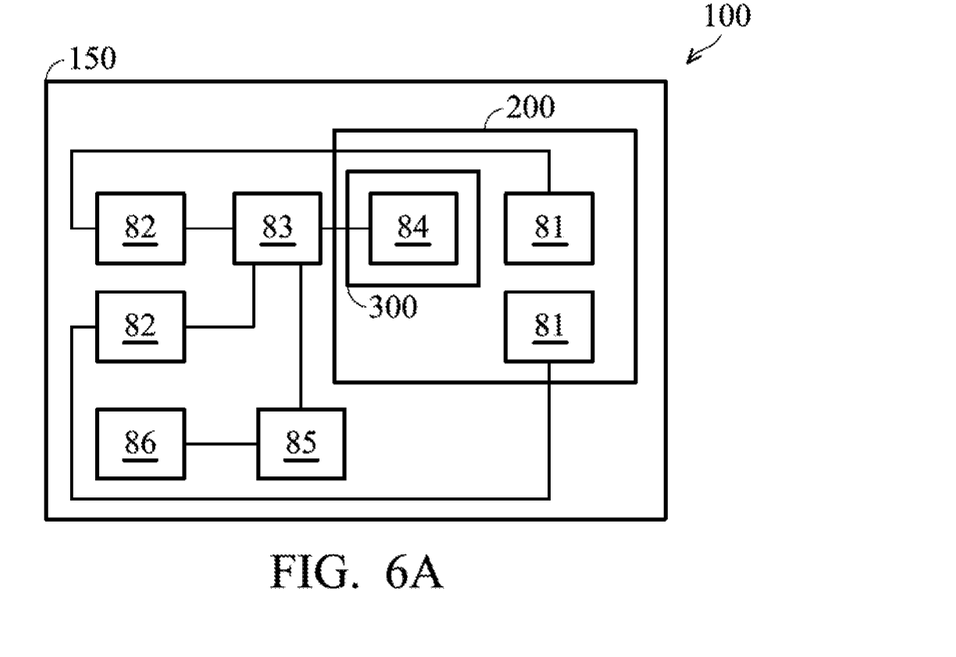
FIG. 6A is a schematic view of a lens driving mechanism according to another embodiment of the present invention.

In another embodiment, as shown in FIG. 6A, the driving circuit unit 84 is disposed in the lens driving module 200 and integrated in the integrated circuit module 300. The amount of elements outside the lens driving module 200 may be reduced in this configuration when comparing with the configuration in FIG. 4A, thereby mechanism miniaturization may be achieved. The digital signal processor 85 is disposed outside the lens driving module 200 and may be electrically connected to multiple acceleration sensors 86, so it is more suitable to be applied in a multiple-lens driving module.

Figure 6B:
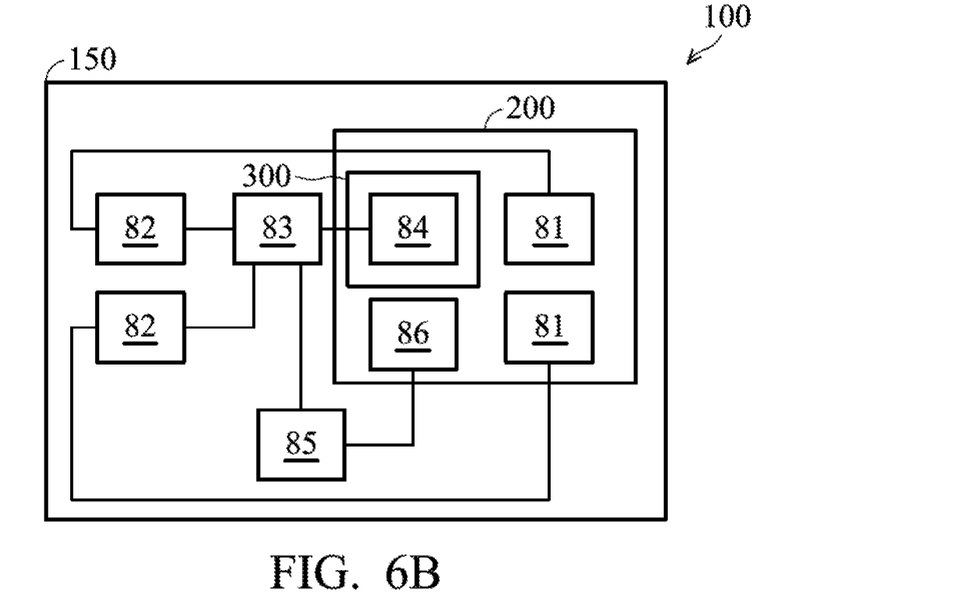
FIG. 6B is a schematic view of a lens driving mechanism according to another embodiment of the present invention.

The acceleration sensor 86 may be disposed in the lens driving module 200, as shown in FIG. 6B, which is different from the configuration in FIG. 6A. In this embodiment, the acceleration sensor 86 is disposed in the lens driving module 200, the amount of elements outside the lens driving module 200 may be reduced, thereby achieving mechanism miniaturization.

Figure 7A:
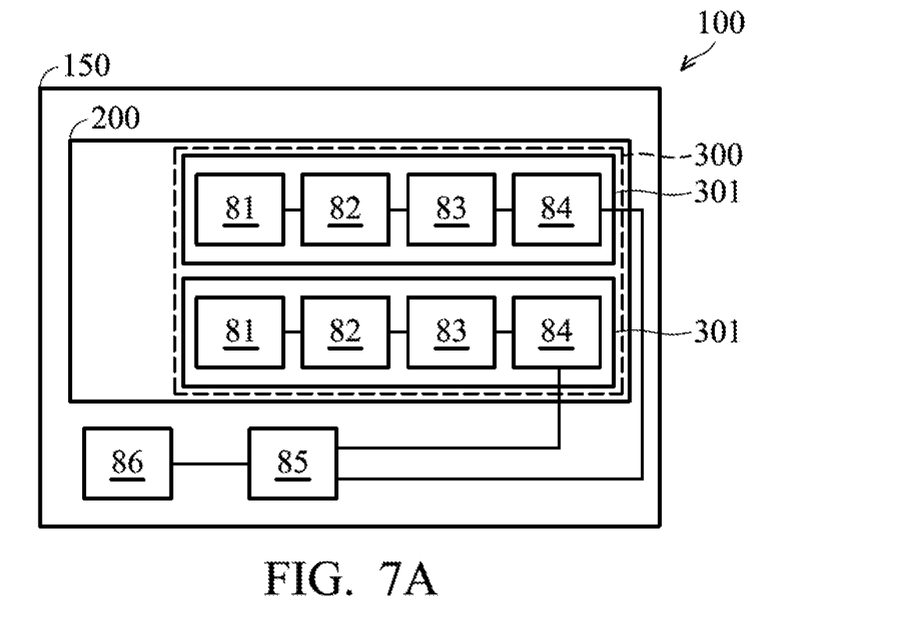
FIG. 7A is a schematic view of a lens driving mechanism according to another embodiment of the present invention.

As shown in FIG. 7A, the difference between this embodiment and the embodiments in FIGS. 4A-6B is that the lens driving mechanism 100 includes two signal amplifying units 82, two controller units 83 and two driving circuit units 84 in this embodiment. The two signal amplifying units 82, the two controller units 83, the two driving circuit units 84 and the two position sensing elements 81 may be disposed in the lens driving module 200 together and integrated in an integrated circuit module 300, for example, packaged in a single integrated circuit element. As a result, the amount of elements outside the lens driving module 200 may be reduced, thereby achieving mechanism miniaturization.

In particular, in this embodiment, the integrated circuit module 300 further includes two integrated circuit elements 301, wherein each of the integrated circuit elements 301 respectively includes a position sensing element 81, a signal amplifying unit 82, a controller unit 83 and a driving circuit unit 84. Based on this configuration, the performance of the lens driving module 100 may be enhanced and may be especially suitable to be applied in a multiple-lens driving module. Furthermore, the digital signal processor 85 is disposed outside the lens driving module 200 and thereby may be electrically connected to multiple acceleration sensors 86, so it is also suitable to be applied in a multiple-lens driving module.

Figure 7B:
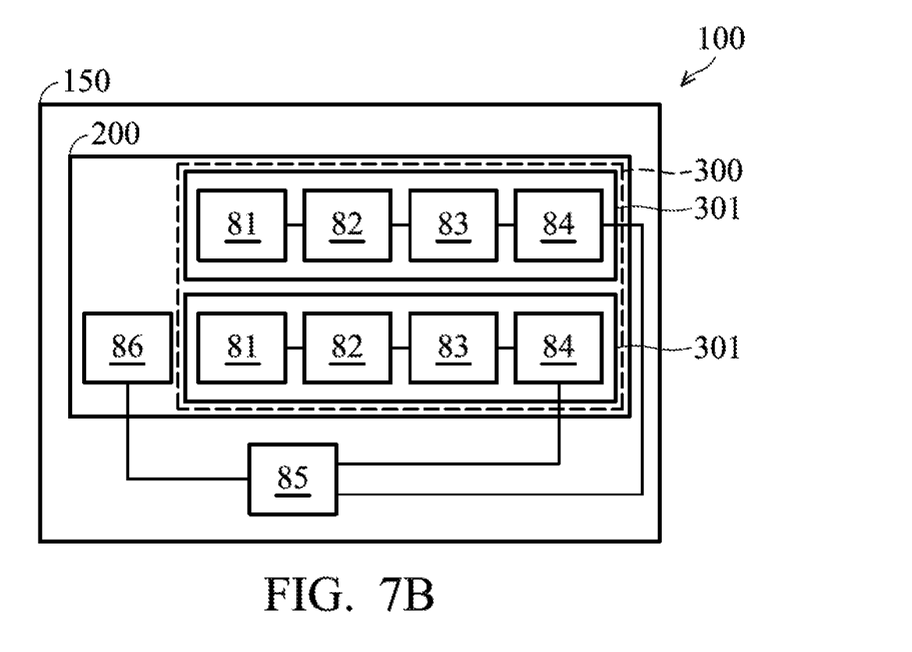
FIG. 7B is a schematic view of a lens driving mechanism according to another embodiment of the present invention.

An acceleration sensor 86 may be disposed in the lens driving module 200, as shown in FIG. 7B, which is different from the configuration in FIG. 7A. In this embodiment, the acceleration sensor 86 is disposed in the lens driving module 200, the amount of elements outside the lens driving module 200 may be reduced, thereby achieving mechanism miniaturization.

Figure 8A:
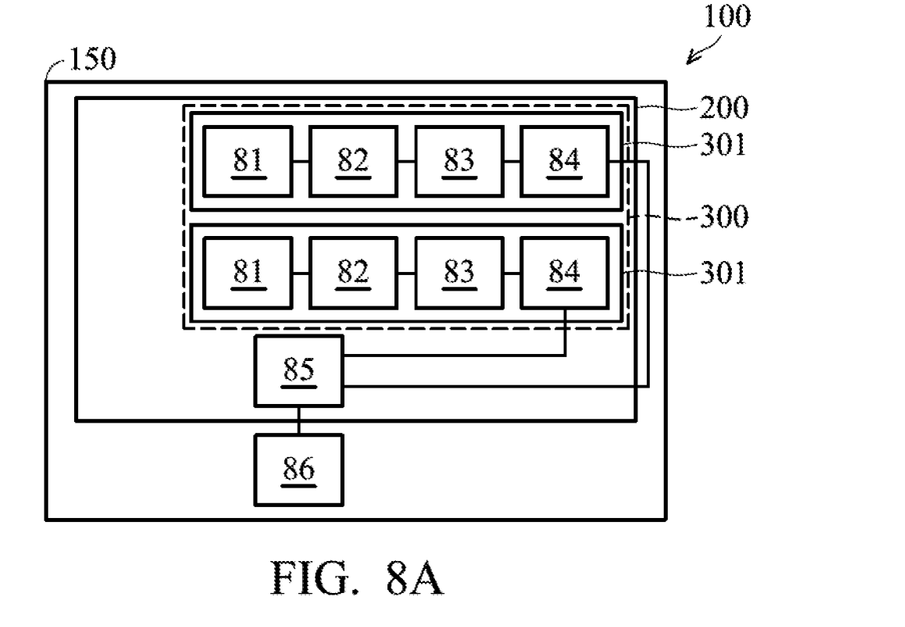
FIG. 8A is a schematic view of a lens driving mechanism according to another embodiment of the present invention.

In another embodiment, as shown in FIG. 8A, the difference between this embodiment and the embodiment in FIG. 7A is that the digital signal processor 85 is disposed in the lens driving module 200 to reduce the amount of elements outside the lens driving module 200, thereby achieving mechanism miniaturization. Each of the integrated circuit elements 301 respectively includes a position sensing element 81, a signal amplifying unit 82, a controller unit 83 and a driving circuit unit 84. Based on this packaging manner, the performance of the lens driving mechanism 100 may be enhanced. Especially, it may be more suitable to be applied in a multiple-lens driving module.

Figure 8B:
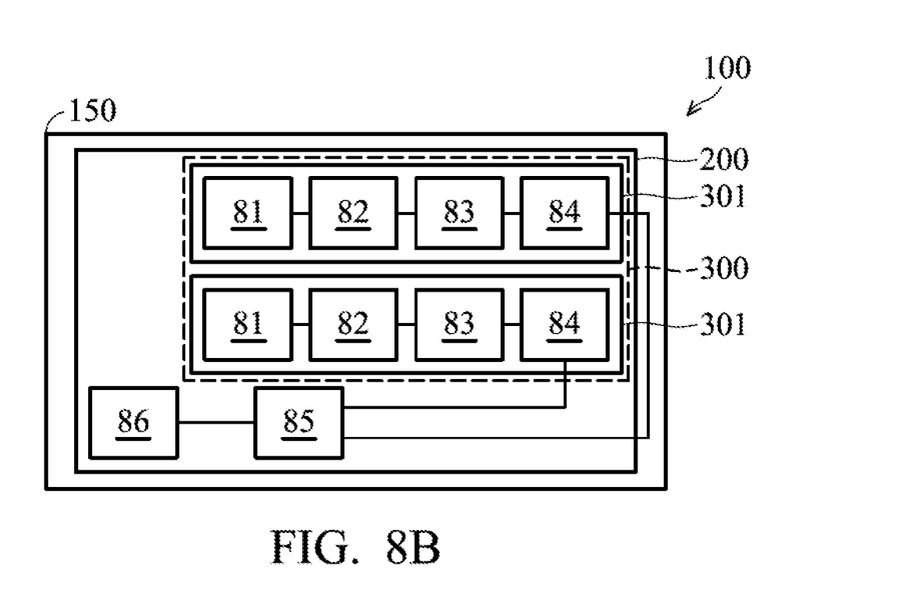
FIG. 8B is a schematic view of a lens driving mechanism according to another embodiment of the present invention.

An acceleration sensor 86 may be disposed in the lens driving module 200, as shown in FIG. 8B, which is different from the configuration in FIG. 8A. In this embodiment, the acceleration sensor 86 is disposed in the lens driving module 200, so the amount of elements outside the lens driving module 200 may be reduced, thereby achieving mechanism miniaturization.

Figure 9A:
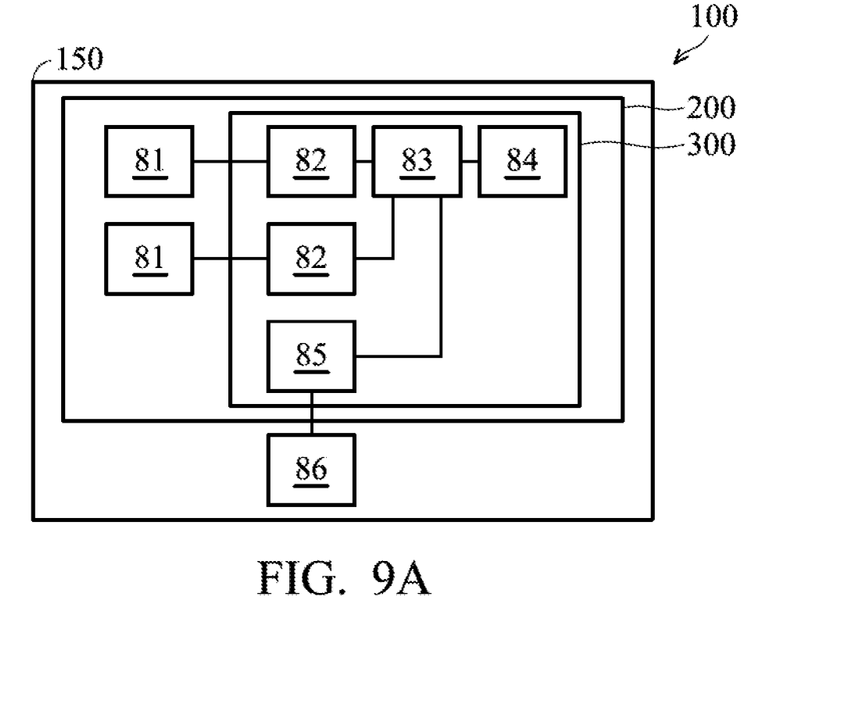
FIG. 9A is a schematic view of a lens driving mechanism according to another embodiment of the present invention.

Further referring to another embodiment illustrated in FIG. 9A. The difference between this embodiment and the embodiment in FIG. 4A is that the integrated circuit module 300 is disposed in the lens driving module 200 to reduce the amount of elements outside the lens driving module 200, thereby achieving mechanism miniaturization.

Figure 9B:
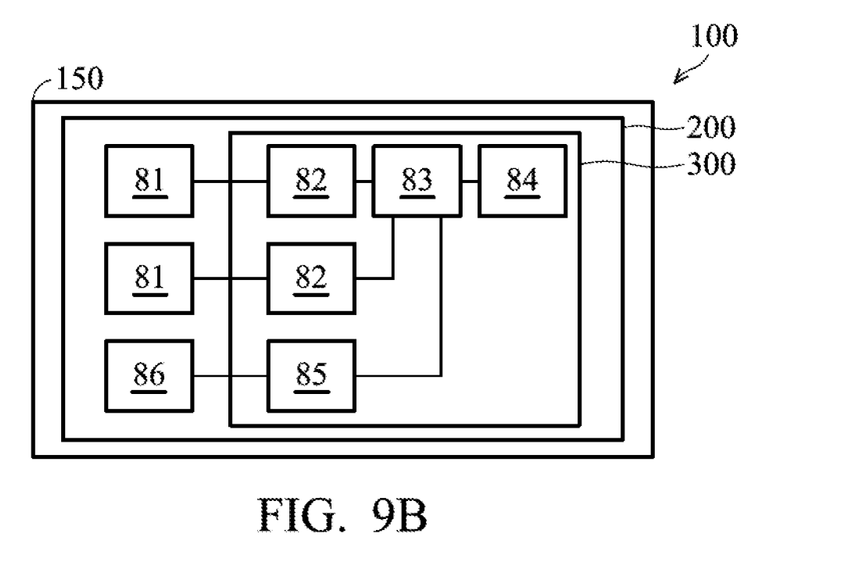
FIG. 9B is a schematic view of a lens driving mechanism according to another embodiment of the present invention.

An acceleration sensor 86 may be disposed in the lens driving module 200, as shown in FIG. 9B, which is different from the configuration in FIG. 9A. In this embodiment, the acceleration sensor 86 is disposed in the lens driving module 200, so the amount of elements outside the lens driving module 200 may be reduced, thereby achieving mechanism miniaturization.

Figure 10A:
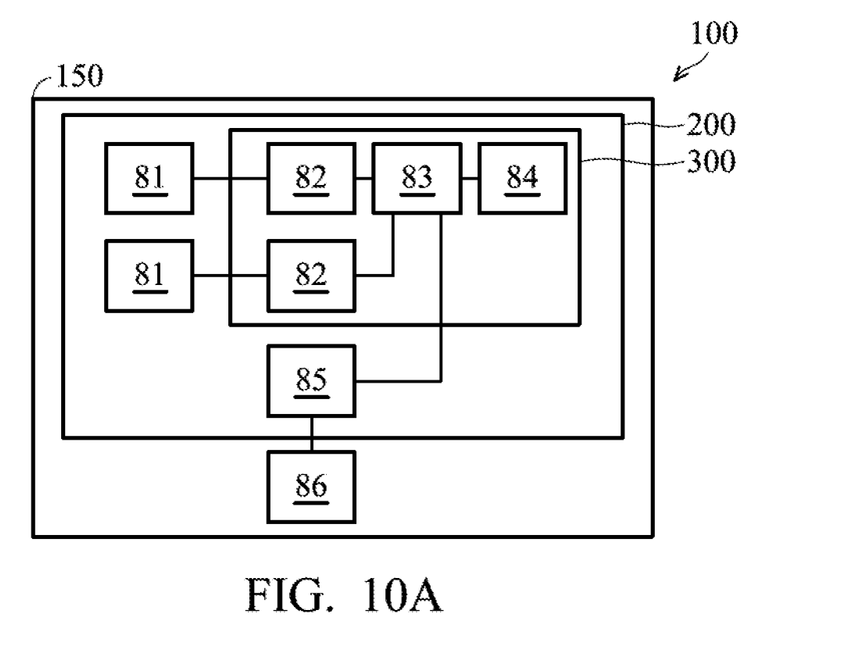
FIG. 10A is a schematic view of a lens driving mechanism according to another embodiment of the present invention.

In another embodiment, as shown in FIG. 10A, two position sensing elements 81, two signal amplifying units 82, a controller unit 83, a driving circuit unit 84 and a digital signal processor 85 are disposed in the lens driving module 200, so the amount of elements outside the lens driving module 200 may be reduced, thereby achieving mechanism miniaturization. The two signal amplifying units 82, the controller unit 83 and the driving circuit unit 84 are packaged together in the integrated circuit module 300, such as be integrated in an integrated circuit element, so the space of the lens driving mechanism 100 may be saved and the performance of the lens driving mechanism 100 may be enhanced.

Figure 10B:
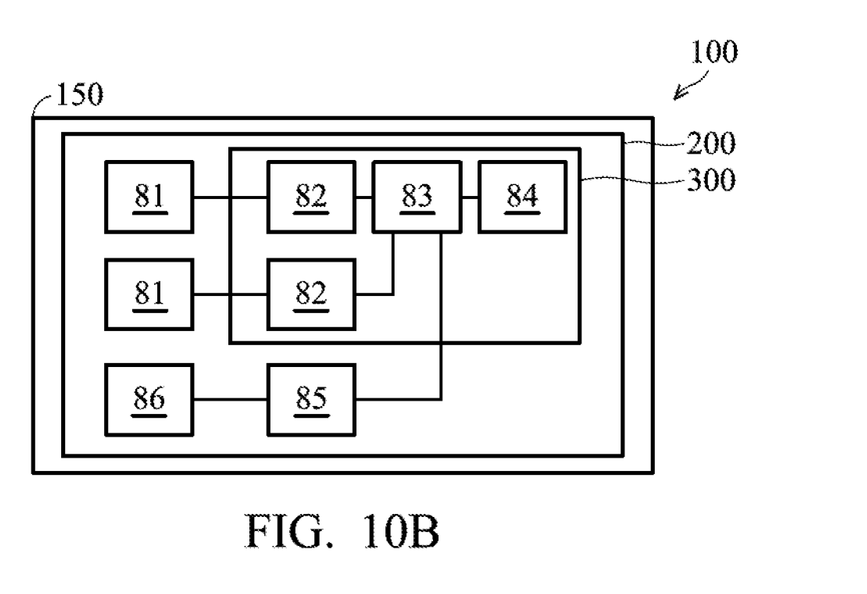
FIG. 10B is a schematic view of a lens driving mechanism according to another embodiment of the present invention.

An acceleration sensor 86 may be disposed in the lens driving module 200, as shown in FIG. 10B, which is different from the configuration in FIG. 10A. In this embodiment, the acceleration sensor 86 is disposed in the lens driving module 200, so the amount of elements outside the lens driving module 200 may be reduced, thereby achieving mechanism miniaturization.

It should be noted that the integrated driving module 300 in the aforementioned embodiments may be integrally formed with the base 20 in the lens driving module 200 (FIG. 2) as one piece by semiconductor embedded substrate (SESUB) technology. The thickness of the lens driving mechanism may be reduced by this technology to achieve mechanism miniaturization.

Figure 11:
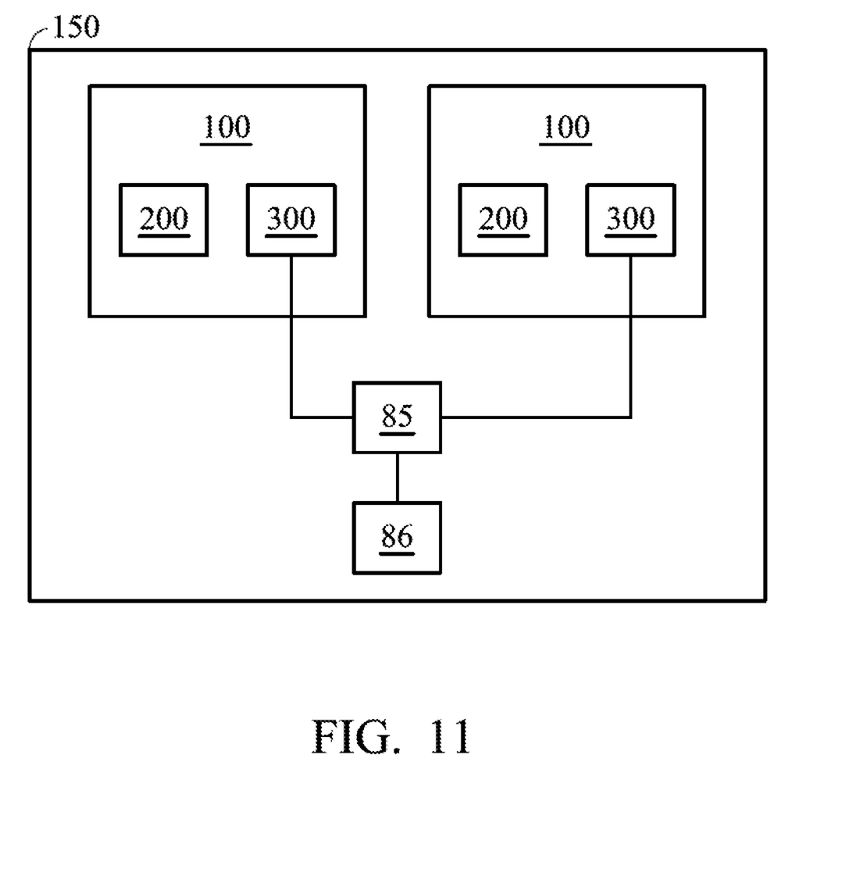
FIG. 11 is a schematic view of a multiple-lens driving system according to another embodiment of the present invention.

It should be realized that the lens driving mechanism 100 may be applied in a multiple-lens driving system (e.g. a duel-lens driving system). For example, as shown in the multiple-lens driving system in FIG. 11, two lens driving mechanisms 100, a digital signal processor 85 and an acceleration sensor 86 may be disposed together on a substrate 150 (only a lens driving module 200 and an integrated circuit module 300 are shown in the two lens driving mechanisms 100, and other elements are omitted for simplicity), wherein the digital signal processor 85 is electrically connected to the integrated circuit module 300 and the acceleration sensor 86 in the two lens driving mechanisms 100. In this configuration, it is possible for different lenses to perform different functions, such as optical image stabilization or auto focus, etc.

In summary, a lens driving mechanism is provided in this invention. The lens driving mechanism includes a lens driving module therein, wherein the lens driving module at least includes an integrated circuit module, such as a signal amplifier, a controller, a driving circuit unit, a digital signal processor or an acceleration sensor, etc. As a result, the amount of driving circuit elements outside the lens driving mechanism may be reduced, thereby achieving mechanism miniaturization.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. A lens driving mechanism, comprising:
a lens holder for holding a lens;
a circuit board disposed at one side of the lens holder;
a driving element;
a position sensing element disposed on the circuit board; and
an integrated circuit module disposed on the circuit board, wherein the integrated circuit module comprises a driving circuit unit, and the driving circuit unit is electrically connected to the driving element to drive the lens holder to move relative to the circuit board by transmitting a driving signal to the driving element, wherein transmission of the driving signal is only in the lens driving mechanism.

2. The lens driving mechanism as claimed in claim 1, wherein the integrated circuit module further comprises a controller unit electrically connected to the driving circuit unit and the position sensing element.

3. The lens driving mechanism as claimed in claim 2, wherein the integrated circuit module further comprises a signal amplifying unit electrically connected to the position sensing element and the controller unit.

4. The lens driving mechanism as claimed in claim 3, wherein the controller unit, the signal amplifying unit and the driving circuit unit are integrated in an integrated circuit element.

5. The lens driving mechanism as claimed in claim 3, wherein the controller unit, the signal amplifying unit, the driving circuit unit and the position sensing element are integrated in an integrated circuit element.

6. The lens driving mechanism as claimed in claim 1, wherein the integrated circuit module further comprises a controller unit and two signal amplifying units, and the driving circuit unit, the controller unit and the signal amplifying units are integrated in an integrated circuit element.

7. The lens driving mechanism as claimed in claim 1, further comprising two position sensing elements, and the integrated circuit module further comprises two driving circuit elements, two controller units and two signal amplifying units, wherein the position sensing elements, the driving circuit units, the controller units and the signal amplifying units are respectively integrated in two integrated circuit elements.

8. The lens driving mechanism as claimed in claim 1, further comprising an acceleration sensor, the integrated circuit module comprises a controller unit, and the controller unit is electrically connected to the acceleration sensor.

9. The lens driving mechanism as claimed in claim 8, wherein the acceleration sensor is disposed on the circuit board.

10. The lens driving mechanism as claimed in claim 9, further comprising a digital signal processor electrically connected to the controller unit and the acceleration sensor.

11. The lens driving mechanism as claimed in claim 10, wherein the digital signal processor is disposed on the circuit board.

12. The lens driving mechanism as claimed in claim 1, further comprising a base, wherein the base and the integrated circuit module are formed integrally by a semiconductor embedded substrate technology.

13. A multiple-lens driving system, comprising two lens driving mechanisms as claimed in claim 1, an acceleration sensor and a digital signal processor, wherein the digital signal processor is electrically connected to the integrated circuit modules and the acceleration sensor in the lens driving mechanisms.

14. The lens driving mechanism as claimed in claim 1, wherein the integrated circuit module further comprises a controller unit electrically connected to the driving circuit unit, a control signal is delivered from the controller unit, and the driving signal is directly output by the driving circuit unit after the control signal is received by the driving circuit unit.

15. A lens driving mechanism, comprising:
a lens holder for holding a lens;
a circuit board disposed at one side of the lens holder;
a driving element;
a position sensing element disposed on the circuit board; and
an integrated circuit module electrically connected to the driving element and disposed on the circuit board for driving the lens holder to move relative to the circuit board by transmitting a driving signal to the driving element, wherein transmission of the driving signal is only in the lens driving mechanism, wherein the integrated circuit module comprises an acceleration sensor.

* * * * *